United States Patent [19]

Tang et al.

[11] Patent Number: 4,756,890
[45] Date of Patent: Jul. 12, 1988

[54] REDUCTION OF $NO_x$ IN FLUE GAS

[75] Inventors: John T. Tang; Juha P. Sarkki; Asfaha Tesfai; Folke Engstrom, all of San Diego, Calif.

[73] Assignee: Pyropower Corporation, San Diego, Calif.

[21] Appl. No.: 33,453

[22] Filed: Apr. 1, 1987

Related U.S. Application Data

[63] Continuation-in-part of Ser. No. 861,514, May 9, 1986, abandoned.

[51] Int. Cl.$^4$ .......................... C01B 21/00; B01J 8/00; B01D 50/00; B01D 53/34
[52] U.S. Cl. .................................. 423/235; 423/239; 422/168
[58] Field of Search .............. 423/235, 235 D, 239 A, 423/239, 242 A, 242 R, 244 A, 244 R; 422/168

[56] References Cited

U.S. PATENT DOCUMENTS

| | | | |
|---|---|---|---|
| 3,900,554 | 8/1975 | Lyon | 423/235 |
| 3,929,967 | 12/1975 | Cann | 423/242 |
| 4,014,981 | 3/1977 | Wainer | 423/244 |
| 4,154,803 | 5/1979 | Uchikawa et al. | 423/239 |
| 4,181,705 | 1/1980 | Gumerman | 423/235 |
| 4,208,386 | 6/1980 | Arand et al. | 423/235 |
| 4,393,031 | 7/1983 | Henke | 423/239 |
| 4,519,990 | 5/1985 | Beirlaqua | 423/242 X |

FOREIGN PATENT DOCUMENTS

| | | | |
|---|---|---|---|
| 0176293 | 2/1986 | European Pat. Off. | |
| 51-14874 | 5/1976 | Japan | 423/239 |

*Primary Examiner*—Gregory A. Heller
*Attorney, Agent, or Firm*—Fitch, Even, Tabin & Flannery

[57] ABSTRACT $NO_x$ reduction in a combustion product flue gas stream is greatly improved by the efficient mixing of the reducing agent, e.g., $NH_3$ or an $NH_3$ precursor, with the stream in the absence of a catalyst, such as CaO or $CaCO_3$, that promotes undesirable combination of $NH_3$ and $O_2$ to form additional $NO_x$. By employing a high-temperature cyclone separator of the like and by injecting the reducing agent into the stream within such hot cyclone at a location where there is a strong vortex region, extremely efficient mixing of the $NO_x$ reducing agent and the combustion product flue gas is promoted after particulates which are harmful to the reaction that promotes $NH_3$ and $NO_x$ reduction have been separated from the flue gases. A refractory-lined cyclone separator may be employed, and a plurality of injectors used which discharge liquid or gas into the strong vortex region.

17 Claims, 2 Drawing Sheets

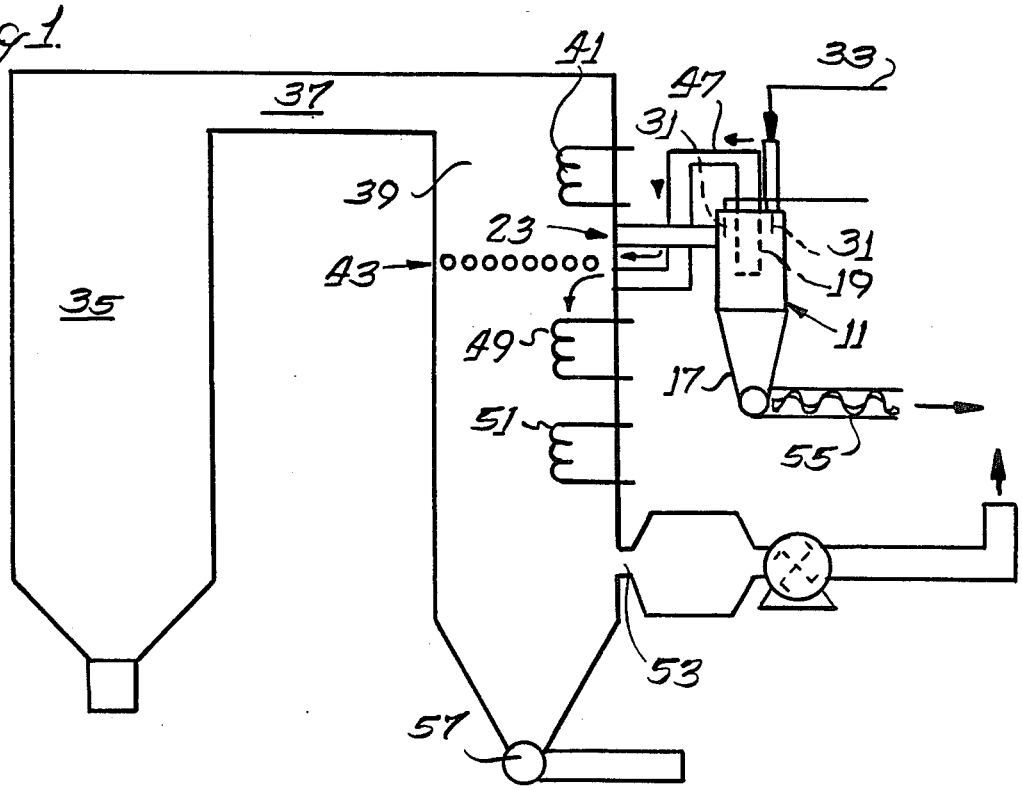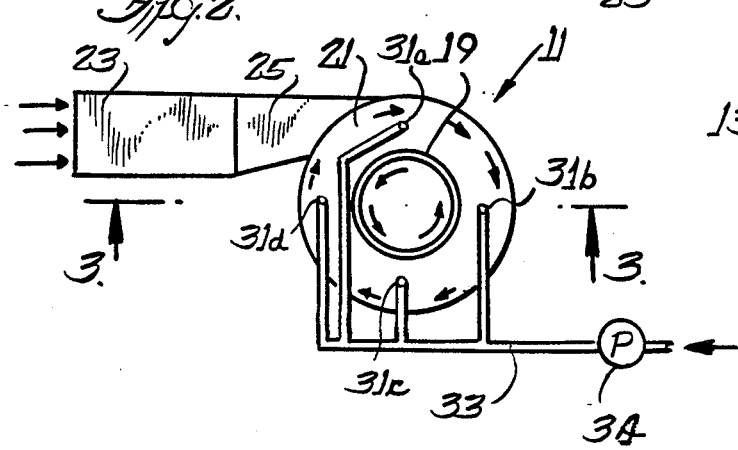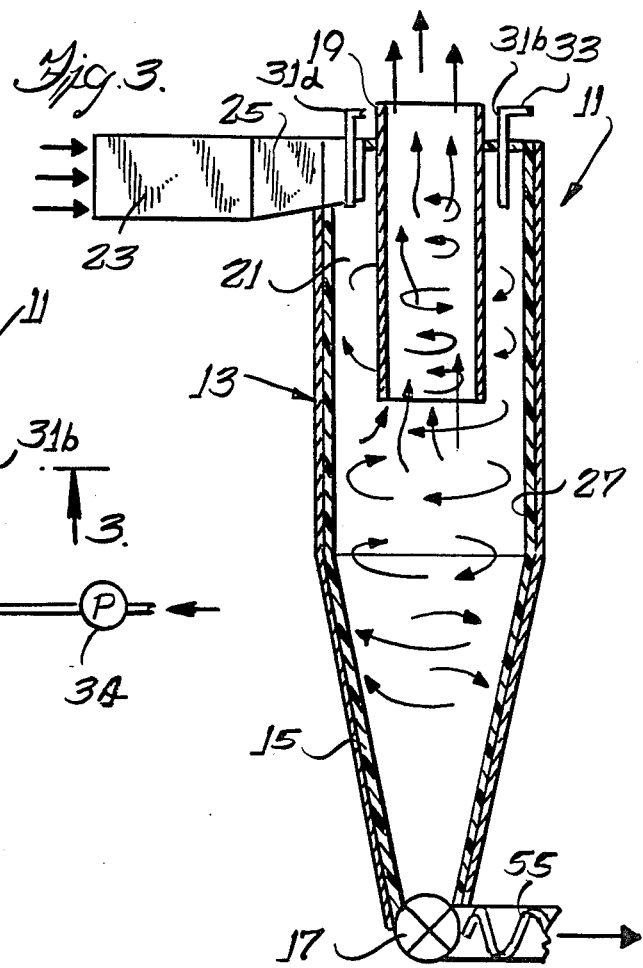

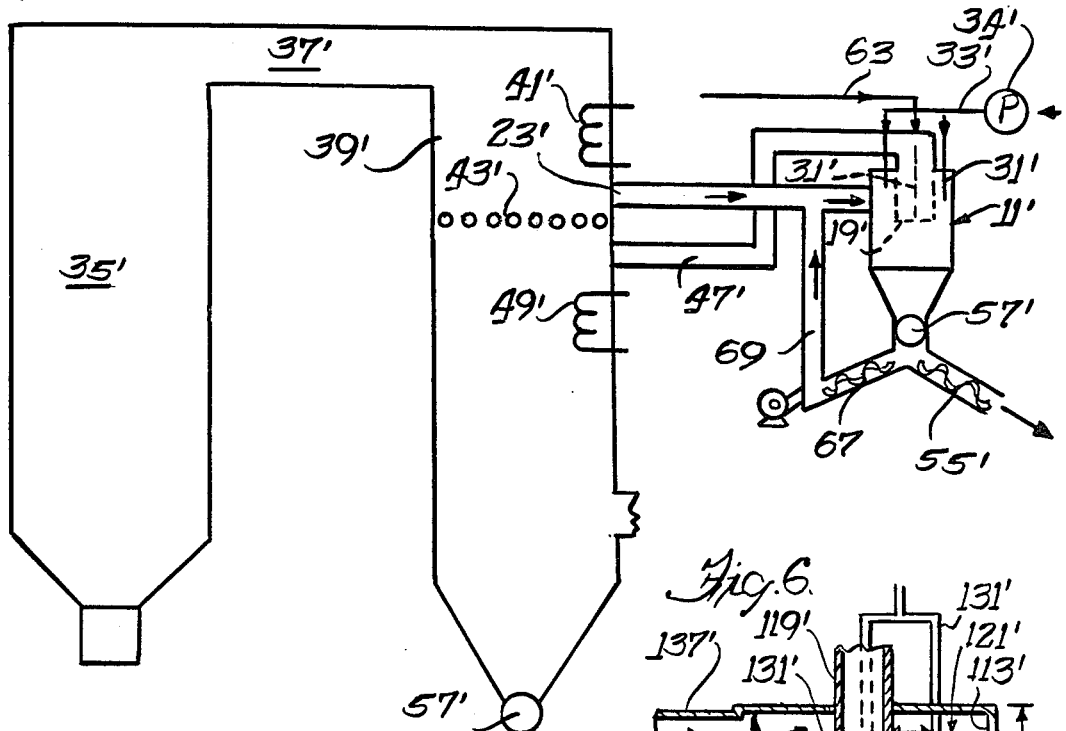
Fig. 4
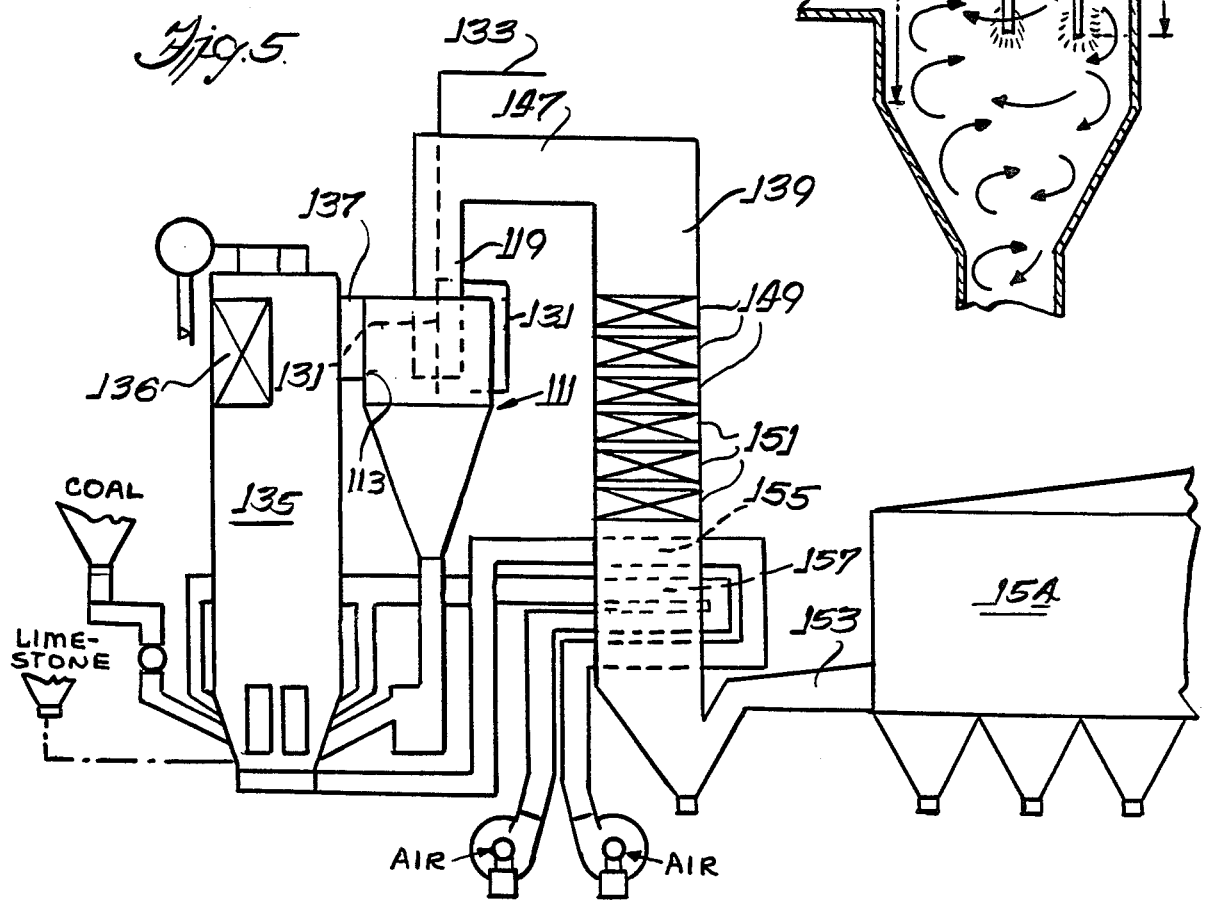
Fig. 5
Fig. 6

REDUCTION OF NO_x IN FLUE GAS

This application is a continuation-in-part of our earlier application Ser. No. 861,514, filed May 9, 1986, and now abandoned.

The present invention relates to the reduction of nitrogen oxide levels in flue gas from combustion units and more particularly to the reduction of $NO_x$ levels by introducing reducing agents into a cyclone separator that is incorporated into a section of the overall system at a location where favorable reaction conditions are present.

BACKGROUND OF THE INVENTION

The invention relates to methods for lowering the nitrogen oxides in flue gas produced from the combustion of substantially any combustible fuel including solid fuels, sludges, gaseous fuels or the like. However, the invention provides a particularly improved fluidized bed combustion process wherein the effluent stack gases can be managed economically to meet current environmental standards.

Fluidized bed combustion of fuels is a well known practice. Typically, air is introduced through a plenum where it is distributed through an air distribution grid. Fuel fluidizing particles and sorbents, such as limestone or dolomite, are fluidized and reacted in the furnace at temperatures normally in the 1400°–1700° F. range. This temperature is substantially lower than those practiced with a conventional furnace. This temperature range, besides resulting in excellent fuel burnout, is also suitable for reacting sulfur oxides with the sorbents in the combustion chamber. Thus, sulfur oxide emissions from sulfur-containing fuel can be substantially reduced, as by the addition of limestone, allowing the burning of relatively high sulfur coals with reduced pollution.

Nitrogen oxides are generated when burning any fuels and result from thermal fixation of nitrogen in the air and the conversion of fuel nitrogen. The former reaction is favored at high temperatures (above about 1800° F.) while the latter is of greater concern at lower temperatures, e.g., those generally found in fluidized bed combustion systems. Because nitrogen oxides are related to the formation of "photochemical smog" and can be poisonous at low exposure levels (the TLV of $NO_2$ is 5 PPM), there is an ongoing concern with the minimization of the $NO_x$ levels released from combustion systems.

It has been suggested in U.S. Pat. No. 3,900,554 to non-catalytically remove nitrogen oxides from flue gases having exited a conventional furnace by injecting ammonia into the effluent stream while it is at a temperature range of 1600°–2000° F. European published patent application No. 176,293 also discloses the use of $NH_3$ for $NO_x$ control via injection into a flue gas stream prior to its entry into a centrifugal separator. U.S. Pat. No. 4,335,084 suggests even higher temperatures. Many other patents have suggested the use of ammonia with catalysts to reduce nitrogen oxides. Some of these patents that utilize lower temperatures (e.g. 250°–930° F.) include U.S. Pat. Nos. 3,887,683 (activated charcoal catalyst), 4,056,660 ($V_2O_5/Mn_2O_3$ catalyst), 4,010,238 (various transition metal catalysts), 4,002,723 (noble metal catalysts), 4,049,777 (CrO catalyst), 4,031,185 (Cu-halide catalyst) and 4,070,440 (alpha $Fe_2O_3$ catalyst).

Several other U.S. patents for example, U.S. Pat. Nos. 3,894,141 and 3,867,507, suggest using a hydrocarbon rather than ammonia in order to reduce nitrogen oxides. Still other U.S. patents, such as U.S. Pat. Nos. 4,325,924 and 4,208,386, utilize urea for $NO_x$ emission reduction, and U.S. Pat. Nos. 4,154,803 and 4,507,269 disclose other ammonia precursors. Other U.S. patents, such as U.S. Pat. Nos. 4,119,702 and 4,115,515, utilize additives such as hydrogen, ozone and hydrogen peroxide to improve system performance.

U.S. Pat. No. 4,218,427 suggests using a fluidized bed of pulverized coal at a temperature from about 400°–700° C. U.S. Pat. No. 4,181,705 discloses the injection of ammonia or an ammonia-producing precursor directly into the fluidized bed combustion region of the furnace. U.S. Pat. No. 3,929,967 discloses a method for treating flue gases containing $NO_x$ and $SO_x$ primarily for reducing the amount of $SO_x$ by contacting the effluent gas with ammonia in gaseous form at a temperature of preferably about 700°–800° F. in an amount sufficient to react with substantially all of the sulfur trioxide; the reaction desirably results in the conversion of $SO_x$ to ammonium sulfite and ammonium bisulfate, following which reaction the larger solids are removed by a mechanical separator, such as a cyclone separator, followed by a high-temperature electrostatic precipitator. Subsequently ammonia is recovered from the ammonium sulfur oxide solids.

Many other processes are taught in the art for the removal primarily of sulfur dioxide, for example U.S. Pat. No. 4,369,167 teaches the use of a lime solution, which may also include a second scrubbing unit for specifically removing $NO_x$ using a suitable scrubbing medium, such as a dichromate. Of course it is well known to inject limestone into the combustion chamber itself for the reduction of $SO_x$. It is also known that the use of ammonia for the treatment of flue gases, particularly at certain temperatures, will result in the removal of $SO_3$ by reaction with ammonia and water to yield ammonium sulfate; thus, the use of ammonia or an ammonia precursor can also have an effect on reducing the $SO_x$ level.

SUMMARY OF THE INVENTION

One critical parameter in the efficient performance of an $NO_x$ reduction process has been found to be achieving good mixing of the reducing agent with the combustion product flue gas; another has been found to be the avoidance of undesirable side reactions with a reducing agent and oxygen, as catalyzed by limestone or calcined limestone (CaO) used for $SO_x$ control. It has been found that, by employing a high-temperature cyclone separator or the like and by injecting the reducing agent into the stream at a specific location within the hot cyclone, extremely efficient mixing of the $NO_x$ reducing agent is achieved with the combustion product flue gas after particulates such as limestone and CaO have been separated therefrom. The high-temperature cyclone separator may be refractory-lined or it may be adapted to operate in a hot condition by cooling its outer surface by a jacket through which water, steam or air is circulated. Depending on the reducing agents and the process conditions, the agent may be injected either with or without carrier gas. This carrier gas may consist of steam, nitrogen, flue gas, any inert gas or a combination of these. The location of the injection port or ports within the cyclone is determined somewhat by the process conditions and the $NO_x$ reducing agent employed.

Process conditions to be considered when choosing the location of injectors include gas stream temperature, flue gas composition, load turndown, the type of reducing agent or agents, and particularly the amounts of particulate loading.

The use of a high-temperature cyclone separator significantly simplifies the injection of reducing agents, as compared to many injection arrangements now being used which are very complicated in comparison.

In one preferred embodiment, the invention is incorporated as a part of a fluidized bed combustion system in which fuel is burned in a bed that includes ash, sulfur-capturing sorbents, i.e. limestone and the like, producing a flue gas stream in the temperature range of 1400°-1800° F. The removal of nitrogen oxides is effectively and efficiently accomplished without addition of a scrubber system. The invention can also be utilized in any furnace system, such as a pulverized coal or stoker or oil-burning unit, where $NO_x$ release is to be minimized. The cyclone (or cyclones) is arranged in such a way that the flue gas has generally given up some heat at certain primary convective surfaces but remains at an appropriate temperature when it then passes through the cyclone or other high vortex device where very efficient mixing takes place between the combustion product flue gas (after entrained particulates have been separated therefrom) and the injected reducing agent or reducing agents. The flue gas can then be rerouted back to another region of a convective zone from which it was diverted or to another convective zone where further heat transfer can take place.

BRIEF DESCRIPTION OF THE DRAWINGS

FIG. 1 shows a schematic representation of a standard fuel-burning combustion system, which generally represents one of the many combustion systems with which the claimed invention can be utilized, illustrating a combustion furnace connected by a duct leading to a convective section that contains a diversion to a cyclone and which eventually leads to the stack through which there is exit to the atmosphere.

FIG. 2 is a top view which illustrates preferred injection locations in the roof of a cyclone separator, wherein a plurality of injection ports extend through the roof of the cyclone to locations near the radially zero velocity zone, which is approximately halfway between the cyclone inner wall and the cylindrical wall of a central gas outlet duct.

FIG. 3 is a vertical sectional view taken generally along the line 3—3 of FIG. 2 showing a generally preferred arrangement of injectors within one type of cyclone separator.

FIG. 4 is a schematic illustration of an $NO_x$ removal system for a stream carrying large amounts of $CaSO_4$ and wherein an $NO_x$ reducing agent, e.g., urea particles, is fed into the cyclone, which agent could optionally include some solid material, such as nickel oxide or other catalyst. The particulates are recovered from the bottom of a cyclone where portions are recycled back to the cyclone inlet duct through a pneumatic-conveying pipe using a gas-conveying medium where the sorbents present have a further opportunity to react.

FIG. 5 is a schematic representation of another alternative embodiment which incorporates a circulating fluidized bed combustion system, wherein some heat transfer occurs generally throughout the combustion furnace following which the entire stream flows to a cyclone which is in turn connected to a convective section that leads to the stack through a bag house or the like.

FIG. 6 is a vertical sectional view through another cyclone separator, similar to that shown in the FIG. 5 arrangement, illustrating the preferred locations for injection of $NO_x$ reducing agents.

DETAILED DESCRIPTION OF PREFERRED EMBODIMENTS

It has been found that the technique of using ammonia or an ammonia-liberating precursor or some other similar reducing agent for the purpose of reducing $NO_x$ in a hot combustion product gas stream is sensitive to temperature, to overall composition of the gas stream and, most importantly, to obtaining rapid and intimate contact between the reducing agents being injected and the $NO_x$ components of the stream while minimizing any contact between such reducing agents and lime, limestone or like particulate materials that are used for $SO_x$ reduction. It has been found that the latter objective is obtained by achieving prompt and intimate mixing of the injected reducing agents and the fast-moving gas stream in a region of high-temperature cyclone separation means where a strong vortex is present and where substantial separation of the particulate matter from the stream has already been accomplished. A refractory-lined cyclone separator or a more standard cyclone separator equipped with an exterior cooling jacket designed to maintain its metallic body walls within an acceptable temperature range so as to avoid potential structural deterioration, because of extended exposure to high heat, may be used.

As discussed more fully hereinafter, the gas stream being treated may be a combustion product stream generated from any type of furnace employing air to burn a carbonaceous fuel which will generate a combustion products containing nitrogen oxides and/or sulfur oxides that are generally regulated in countries throughout the world so that certain minimum emission standards must be maintained. As further explained hereinafter, suitable reducing agents are injected into the gas stream at stategic locations so as to efficiently chemically achieve the reduction of nitrogen oxide levels to meet the appropriate standards. FIGS. 2 and 3 illustrate a cyclone separator 11 which may be used and which is adapted for high-temperature operation. The cyclone separator 11 includes an upper body cylinder 13 of right circular cross-section which surmounts a body cone 15 of hollow frustoconical shape, the lower end of which terminates in an outlet 17 for particulates.

Disposed centrally within the body cylinder is an exit duct 19, also of a circular cross-section, the diameter of which is equal to between about 30 and about 80 percent of the interior diameter of the cylinder. Generally the exit duct 19 will be coaxial with the body cylinder 13 and preferably extends downward a substantial distance into the cyclone, e.g. several feet, thus creating an annular entrance region 21 into which the entering gas stream will be directed. A combustion products gas stream at a suitable temperature is fed through an inlet duct 23 to a transition section 25, which constitutes the outlet from the duct and the inlet to the cyclone 11. Although such transition section is of slightly reduced cross sectional area for most cyclones, it may have the same area.

As best seen in FIG. 2, the gas stream enters tangentially into the annular region 21 with the particulates within the stream being forced immediately outward to the region adjacent the outer wall while the major gaseous portion creates a strong vortex movement within the interior region of the annular space, spiraling downward generally along the exterior surface of the exit duct 19. Because the only gas outlet from the cyclone is upward through the interior of the exit duct 19, a second vortex develops interior of the first, with the gas spiraling upward into the interior of the duct. Of course, the primary purpose of the cyclone separator is to cause particulate material, by virtue of its inertia, to move immediately outward toward the outer wall of the body cylinder section 13 and to eventually reach the lower outlet 17. Although the cyclone 11 operates as well in a generally horizontal position as in a vertical position, the difficulty with removing accumulated particulates and the tendency of such particulates to plug the outlet in a generally horizontal orientation are such that a vertical orientation, as illustrated in FIG. 1, is preferred. Likewise, the cyclone 11 operates equally well whether disposed on the suction side or on the pressure side of a blower or other such large scale gas-moving device.

To adapt the cyclone 11 for high-temperature use, it is preferably provided with a layer of high-temperature insulation 27 upon the entire interior surface of the cylindrical wall of the body cylinder section 13. The lower body cone section 15 also preferably is equipped with such high-temperature insulation. A suitable layer of abrasion-resistant refractory brick material may be used, or a suitable refractory insulation material capable of withstanding temperatures of the magnitude that will be encountered, such as felted material of alumina-silica fibers, may be employed. Depending upon the temperature at which the cyclone 11 will be operated and the metal from which the exit duct 19 is made, it may or may not be also insulated with thermal insulation on its exterior surface, and possibly also on its interior surface. However, inasmuch as the exit duct 19 is not a load-bearing member, less insulation may be used or in some instances no insulation may be necessary. As an alternative to insulating the interior surface of the cyclone body section 13, its exterior surface may be appropriately cooled, as by providing an outer, surrounding cooling jacket through which a continuous stream of relatively cool liquid or gas coolant is caused to flow at rates to maintain a desired maximum temperature in the structural wall of the cyclone. Water, air, steam or mixtures thereof are samples of suitable coolants for adapting such a cyclone for high-temperature operation.

The reducing agent or agents which are utilized are injected into the stream using one or more injectors 31 (shown are four equiangularly spaced injectors 31a–31d), and the number of injectors will generally be dependent upon the size of the cyclone being employed. If an exit duct is not used which extends downward a substantial distance, the injector 31d or the injectors 31d and 31c are preferably eliminated to reduce NH$_3$ "slippage", i.e. NH$_3$ bypassing directly to the cyclone outlet duct without reacting, which is inefficient and generally undesirable. All of the injectors are preferably fed by a suitable supply line 33 equipped with an appropriate metering device 34. Similarly, although only a single cyclone is illustrated, the size of the overall installation will determine whether one or multiple cyclones will be employed. Whereas in the past it has often been the practice to build fairly large-diameter cyclones, recently the tendency has been more toward the use of multiple, smaller-diameter cyclones which would operate in parallel, being each connected to an inlet stream header and returning their exit streams through an outlet stream manifold.

The injection locations can be varied within certain limits and still obtain satisfactory performance. Preferably the injectors 31 are located so as to inject the reducing agents into the annular region 21 at a location or locations generally near the upper boundary thereof. Injection of certain gaseous reducing agents into the vortex flow at a location even slightly below the annular region might be effected but would likely be less efficient. It has been found that one of the most effective arrangements for injecting the reducing agents is into a zone where the gas stream momentarily has a very low radially outward velocity, conventionally termed a zero velocity zone. It has been found that prompt, thorough mixing is effected as a result of appropriate injection into such a zone. Injection can be through the roof of the cyclone or through vertical walls defining the annular region 21, preferably near an upper portion thereof, as for example by supporting appropriate injectors at locations where they would generally horizontally penetrate through upper regions of the body cylinder 13 near the roof thereof. Conceivably they could even be installed so as to penetrate outward through the exit duct 19 into the annular region; however, such location would likely require more injection ports along the perimeter of the exit duct. More preferably, multiple injectors 31 are supported in the roof of the cyclone, spaced relatively equiangularly throughout the annular region; as best seen in FIG. 2, four injectors could be arranged at 90° intervals or two could be 180° apart. The illustrated injector locations are approximately radially midway between the outer surface of the exit duct 19 and the inner surface of the body cylinder 13 and thus relatively squarely within the path of the tangentially entering high-temperature gas stream.

It has been found that injection as described above results in intense and prompt gas mixing because the stream flows in a strong vortex which moves spirally downward. In general, the injection should be such that it is at least initiated within about 0.1 second after the gas flow enters the annular region 21. By injection into or near the radially zero velocity zone at a point where the particulates being carried by the stream have been substantially separated therefrom as a result of moving radially outward because of centrifugal force, the reducing agent spreads out very rapidly throughout the gas stream, thus avoiding the presence of localized pockets of reducing agent and thereby avoiding reactions between ammonia, for example, and either oxygen or sulfur trioxide, which reactions are undesirable in achieving the intended end result. The CaO from limestone, as well as limestone, has been found to particularly efficiently catalyze the reaction NH$_3$ +O$_2$→NO$_x$. +H$_2$O, and thus injection of NH$_3$ into a region where lime is present should be avoided or the treatment may be seriously adversely affected. In essence, injection of ammonia or an ammonia precursor in this manner is believed to form an "ammonia curtain" at the core of the cyclone that prevents NO$_x$ from escaping while clearly minimizing the simultaneous contact of NH$_3$, O$_2$ and CaO, and thus virtually assures that the desired chemical reaction occurs with ammonia and NO$_x$ to form nitrogen gas and water vapor. For example, by injecting ammonia in a molar ratio of about 3/1 to 5/1, moles NH$_3$/moles NO$_x$, it has been found that greater than 70% reduction in the amount of NO$_x$ in a combustion products gas stream can be achieved. Normally, a ratio of at least about 0.5/1 is used.

As indicated hereinbefore, the use of reducing agents to lower the content of nitrogen oxides ($NO_x$) in flue gas streams from the combustion of carbonaceous products is well known. It is well known that power plants, process furnaces, incinerators and the like are significant contributors of $NO_x$, which is generally in the form of NO and which results from some oxygen combining with atmospheric nitrogen in the flame, rather than with the carbonaceous fuel material, a process termed nitrogen fixation. The presence of organic nitrogen compounds in the fuel can also form NO when the fuel is burned. At high temperatures, the major portion of the nitrogen oxides are in the form of NO, with only a minor amount of $NO_2$ and higher oxides; whereas at lower temperatures, equilibrium causes NO to react with atmospheric oxygen to form $NO_2$. Sulfur compounds generally react with oxygen to form sulfur dioxide; however, there will also be some sulfur trioxide and minor amounts of such higher sulfur oxides formed. Coal, gas, oil, shale, peat, lignite and other waste materials will have various amounts of organic nitrogen and sulfur-containing compounds.

There are many known $NO_x$ reducing agents which are used to reduce the NO level in flue gas, and any of these can be employed as a part of the present invention which will operate effectively at the temperature range of interest. It is contemplated that the invention would operate at temperatures above about 800° F., and the pressure is not considered to be a factor as the process will be normally carried out at about atmospheric pressure, consistent with the need to remove the combustion products satisfactorily to serve the needs of the furnace or combustor. In other words, the primary concern is the operation of the furnace or combustor at the desired level so as to produce heat at a desired rate, for the generation of electric power, process heat or the like, and the reduction process is simply designed to operate effectively within the maximum and minimum rates at which the furnace will normally operate. Preferably the processes operate at above 1200° F. and up to about 2000° F., and usually the $NO_x$ reduction process is operated between about 1400° and about 1900° F. in combination with a hot combustion products stream from a fluidized bed boiler, and is able to produce $NO_x$ levels well within existing environmental protection agency standards.

Within the foregoing temperature range, the preferred $NO_x$ reducing agents are ammonia and precursors of ammonia. Examples of ammonia precursors include ammonium carbonate, ammonium formate, ammonium oxalate as well as urea which for purposes of this application is considered to be an ammonia precursor. Ammonia may be used in its gaseous form or as a solution in water, and water solutions of the precursors may also be employed. While it is uncertain whether the urea reacts directly with NO and/or first dissociates to ammonia which in turn takes part in the chemical reaction, the ultimate result is the same, producing molecular nitrogen and water vapor, and for this reason urea is termed a precursor of ammonia. Urea is preferably employed in the form of drops of atomized liquid, e.g., of an aqueous solution.

The amount of reducing agent which is employed is dependent upon the composition of the gas in the combustion products stream and the desired levels which are to be met in the flue gas eventually being exhausted to the atmosphere. In general, it is anticipated that an amount of $NO_x$ reducing agent between about 0.2 moles and about 10 moles of reducing agent per mole of $NO_x$ in the stream leaving the combustor will be employed. For example, it may be necessary to reduce the $NO_x$ content of the ultimate stream to no more than 100 ppm (parts per million) to meet certain local environmental standards. Should this be the case, more $NO_x$ reducing agent will be employed in such an instance as opposed to meeting a less stringent standard, e.g., 150 or 200 ppm, assuming treatment of combustion products gas stream of the same initial $NO_x$ content.

Moreover, when ammonia or a precursor thereof is used as the $NO_x$ reducing agent, some consideration should be given to regulating the oxygen content of the stream because of the potential reaction of $NH_3$ with $O_2$, which is undesirable because of the creation of additional NO. It has been found that the reaction rate of this particular undesirable reaction is considerably slower at the temperatures, for example, in a preferred range of 1500° to 1700° F. than the desired reaction between $NH_3$ and NO so long as the presence of CaO, which has been found to catalyze the undesirable reaction, is avoided, and thus the desired reaction will predominate presuming the reducing agent can be promptly and thoroughly dispersed throughout the entire combustion products stream at a point after the particulates have been substantially separated. However, so as to minimize any potential effect of oxygen, it is preferably regulated so as to constitute not more than 10 volume percent of the oxygen stream entering the cyclone. Regulation in this manner can be effectively carried out using a fluidized bed combustion boiler where burning is carried out using atmospheric oxygen, and the oxygen content can be maintained well within this limit while achieving sufficient combustion and heat transfer.

Illustrated in FIG. 1 is an example of a typical overall installation adapted to reduce the $NO_x$ level in a combustion products gas stream leaving a coal-burning boiler or the like. Depicted is a boiler wherein particulate coal is burned in a combustion chamber 35 creating a rising combustion products stream having a temperature which may range from about 1400° F. to about 2800° F. The stream exiting from the top of the combustor 35 flows through a transfer duct 37 into a convective section 39 wherein the majority of the heat is extracted from the hot gas, for steam generation or the like. A variety of heat transfer units may be installed within the convective section, such as an economizer 41 located just above a transversely extending heat transfer unit 43 which includes a plurality of parallel heat transfer tubes which effectively block downward flow in the convective section 39 creating a diversion of essentially all of the flue gas into duct 23 leading generally horizontally to a cyclone separator 11 of the type illustrated in more detail in FIGS. 2 and 3. $NO_x$ reducing agents are injected through four injectors 31 which protrude downward through the roof of the cyclone spaced evenly about the annular region 21 at 90° intervals from one another.

The treated flue gas exits upward through the exit duct 19 which discharges into a tubular conduit 47 which returns the gas stream to the convective section 39 at a location just below the diversion heat exchange unit 43 whence the gas stream continues downward past the additional heat transfer units 49, 51 which extract additional heat from the gas stream until it has been lowered to essentially the ultimate discharge temperature. At this point the gas stream exits through a side discharge conduit 53 which can lead, via a fan 54, either directly to a stack for exhaust into the atmosphere or ultimately there via some scrubber or particulate treatment device, such as a bag house or electrostatic precipitator, depending upon the constitution of the stream. Particulate solids that separate out from the flue gas in the high temperature cyclone 11 fall by gravity through the lower outlet 17 and are removed therefrom by a suitable removal device, such as a water-cooled screw conveyer 55. Additional particulate fallout may also occur within the convective section 39, and such particulates can be similarly removed via a lower outlet 57.

Depicted in FIG. 4 is an alternative embodiment in which similar components to those previously described are labeled with prime numbers. Combustion products from the combustor 35' similarly travel through a duct 37' to a convective section 39' which contains a diversion type heat exchange unit 43', and an economizer unit 41' can also be located in the upper portion of the convective section. A similar inlet duct 23' leads from the region just upstream of the diversion heat exchange unit 43' to a high-temperature cyclone 11'. This alternative embodiment is designed to inject either solid urea particles on an aqueous solution of urea to reduce $NO_x$, and injectors 31' are used to deliver or atomize the $NO_x$ reducing agent using air, flue gas or steam. Preferably, a supply line 63 feeds steam to the injectors 31' located in the cyclone 11'. The steam may be supplied through a surrounding coaxial tube which accompanies the $NO_x$ supply line 33', beginning just downstream of a metering device 34', with the injectors 31' being located in the annular region 21' as earlier described.

The treated gas stream similarly spirals downward within the cyclone and then centrally upward through the exit duct 19' where it is returned to the convective section 39' through a return conduit 47', reentering the convective section 39' just downstream from the diversion unit. The particulates including flyash, $CaSO_4$, $CaCO_3$, CaO and some $NO_x$ reducing powder (if used) are removed from the gas stream as a result of the cyclonic action and eventually find their way to the lower outlet 57. The removed particulate material which includes some of the ash from the furnace is a split at the discharge, and a portion is carried by a screw conveyer 55' to waste, as in the FIG. 1 embodiment. The remaining portion is recycled by using a screw conveyer 67 which carries these particles to a pneumatic-conveying pipe 69, which pneumatic-conveying pipe returns these extracted particulates to the inlet duct 23' where they are recycled to the stream ahead of the cyclone for another pass.

Analysis of the gas in the transfer duct 37' and analysis of the gas flowing through the discharge conduit 53' to the stack for exhaust to the atmosphere shows that both the $NO_x$ content and the $SO_x$ content are very substantially reduced by injection of only reasonable amounts of reducing agents.

Illustrated in FIG. 5 is an installation designed to reduce the $NO_x$ level in the combustion products gas stream leaving a circulating fluidized bed boiler. Depicted is a combustor 135 wherein particulate bituminous coal is burned in a fluidized bed creating a rising combustion products stream in the temperature range of about 1550° F. to about 1650° F. A substantial amount of heat is extracted throughout the combustor, and exemplified is one heat-exchange unit 136 located in the upper portion of the combustor 135. The stream exiting from the top of the combustor 135 flows through a short transfer duct 137, having a vertical dimension which is substantially greater than one-half the height of the cylindrical section 113, horizontally to a cyclone separator 111 of the type generally physically illustrated in more detail in FIGS. 2 and 3. $NO_x$ reducing agents are injected through two injectors 131 which protrude inward through the cylindrical sidewall 113 of the cyclone into or slightly below the annular region 121, defined by the vertical projection of the exit duct, in the same general angular locations of injectors 31a and 31b in FIG. 2.

The treated flue gas exits upward through the exit duct 119 which discharges into a tubular conduit 147 which directs the gas stream to a convective section 139 whence the gas stream continues downward past additional heat transfer units 149, 151 and then past two sets of air pre-heaters 155, 157, which supply primary and secondary air to the fluidized bed combustor. The preheaters extract additional heat from the gas stream until it has been lowered to essentially the ultimate discharge temperature. At this point the gas stream exits through a side discharge conduit 153 which leads, via a bag house 154 to a stack for exhaust into the atmosphere.

FIG. 6 is a diagrammatic representation of a centrifugal separator 111' generally similar to that shown in FIG. 5. An entrance duct 137' leads into the upper region of the separator which is shown as having a cylindrical section 113' which has height "h". A central exit duct 119' is located at the top, and the duct extends downward into the upper region and helps to define the annular region at the top. As illustrated, the exit duct 119' extends downward a distance into the cyclone equal to about 0.25 h; preferably, the exit duct extends into the cyclone a distance of between about 0.1 h and about 0.8 h. Depicted are two injectors 131' which are located in the positions of the injectors 31a and 31b in the FIG. 2. For cases where a large amount of limestone or lime particles are present in the flue gas at the cyclone entrance, the injectors preferably extend downward from the roof of the cyclone a distance equal to between about 0.1 h and 0.9 h, and in the illustrated embodiment, the distance is equal to about 0.7 h. However, if the gas contains little or no solids then the injector may extend downwardly beyond h until the ejectors reach the sloping wall. Also indicated is the distance L which designates the radial distance from the outer surface of the exit duct 119 to the interior surface of the vertical cylindrical sidewall 113'. This distance is illustrated as 0.5 L for the injectors shown, and as previously indicated the preferred distance is between about 0.1 L and about 0.8 L.

As an illustrative specific example, particulate coal up to about ¼ inch in size is burned as a part of a fluidized bed in the combustor 135 with the coal containing about one weight percent nitrogen and about three weight percent sulfur. Such coal is introduced into the fluidized-bed combustor 135 at a flow rate of about 110,000 pounds per hour, and air at a temperature of about 400° F. is introduced at a rate equivalent to a weight ratio of air-to-coal of about ten to one. Under these conditions, the coal particles burn to create a bed having a temperature of about 1500° F. to 1650° F. A significant amount of heat is removed from the combustion gases by steam-generating or water-cooled tubes disposed throughout the combustor 135. The combustion products gas stream leaves the upper end of the combustor at a temperature of about 1500° F. to about 1650° F. and at a rate of about 65 million ACF/hr. Analysis of the gas in the transfer duct 137 from the burning of high sulfur coal shows about 160 ppm of $NO_x$ and about 300 ppm of $SO_x$.

The cyclone 111 used to accommodate this amount of flow of hot combustion products has a body cylinder 13 feet in diameter and 17 feet in height, which surmounts a body cone portion. The cyclone is made of carbon steel and is thermally insulated on its interior surface by a layer about 12 inches thick of erosion-resistant insulating material. The exit duct 19 is coaxially located, has an outer diameter of about 5 feet and protrudes downward from the roof of the cyclone a distance of about 3 feet, thus creating an annular zone of that height and a radial dimension of about 4 feet wherein the downwardly directed vortex forms. The injectors 131 are tubes which protrude downward about 4 inches from the refractory material which insulates the cyclone roof and are about ⅜ inch in interior diameter. The tubes are open at their lower end. Two such tubes are arranged generally as shown in FIGS. 2 and 3, 180° apart within the annular region and spaced radially midway between the outer surface of the exit duct and the interior insulated surface of the cyclone body cylinder. Both the injectors 131 are fed from a common supply line 133 using an appropriate metering device 134 which can increase or decrease the flow of the reducing agent depending upon changes in the rate at which combustion products are being created in the fluidized-bed boiler.

Gaseous ammonia is introduced through the supply line into the injectors 131 in the upper portions of the annular region 121 of the cyclone at a rate of about 15 pounds per hour of ammonia. Immediate dispersion of the injected ammonia throughout the entire incoming gas stream takes place as a result of the strong mixing that is promoted by the strong vortex flow. The temperature of the gas entering the cyclone is about 1600° F. Analysis of the gas flowing through the discharge conduit 153 to the stack for exhaust to the atmosphere shows that the $NO_x$ content is about 64 ppm.

As a second illustrative example, particulate coal up to about ¼ inch in size is burned as a part of a fluidized bed in the combustor 135 with the coal containing about one weight percent nitrogen and about three weight percent sulfur. Such coal is introduced into the fluidized-bed combustor 135 at a flow rate of about 110,000 pounds per hour, and air at a temperature of about 400° F. is introduced at a rate equivalent to a weight ratio of air-to-coal of about ten to one. Under these conditions, the coal particles burn at between about 1500° F. and 1650° F. Particulate limestone $CaCO_3$ is injected into the combustor and is quickly calcined to CaO where a major amount of it reacts with $SO_x$ to form calcium sulfate. A significant amount of heat is removed from the combustion gases by steam-generating or water-cooled tubes disposed throughout the combustor 135 at a rate, in this example, up to about 120,000 lb/hr steam production rate, to maintain a bed temperature of about 1550°-1630° F. The combustion products gas stream leaves the upper end of the combustor at a temperature of about 1600° F. and at a rate of about 65 million ACF/hr. Analysis of the gas in the transfer duct 137 shows about 160 ppm of $NO_x$ and about 300 ppm of $SO_x$.

The cyclone 111 used to accommodate this amount of flow of hot combustion products has a body cylinder 13 feet in diameter and 17 feet in height, which surmounts a body cone portion. The cyclone is made of carbon steel and is thermally insulated on its interior surface by a layer about 12 inches thick of erosion-resistant insulating material. The exit duct 19 is coaxially located, has an outer diameter of about 5 feet and protrudes downward from the roof of the cyclone a distance of about 3 feet, thus creating an actual annular zone of that height and a radial dimension of about 4 feet wherein the downwardly directed vortex forms. The injector 131 is a central tube which protrudes downward from the refractory material which insulates the cyclone roof and is about ¼ inch in interior diameter. The tube is open at its lower end and is arranged spaced radially midway between the outer surface of the exit duct and the interior insulated surface of the cyclone body cylinder. One injector 131 is fed using an appropriate metering device 134 which can increase or decrease the flow of the reducing agent depending upon changes in the rate at which combustion products are being created in the fluidized-bed boiler.

An aqueous solution of urea of about 50 weight % urea at a temperature of about 120° F. is introduced through the supply line into the injector 131 where it is atomized with steam flowing through a coaxial ½ inch tube that also carries a cooling air jacket. The injector extends downward through the roof of the cyclone a distance of about 6 feet. The urea solution is injected at a rate equal to about 1 mole of ammonia to each mole of $NO_x$. The injector is positioned at a location similar to the injector 31a, and immediate dispersion of the steam-atomized ammonia throughout the entire incoming gas stream takes place as a result of the strong mixing that is promoted by the strong vortex flow. The temperature of the gas entering the cyclone is about 1600° F. Analysis of the gas flowing through the discharge conduit 153 to the stack for exhaust to the atmosphere shows that there is substantially no $NH_3$ slippage, that the $O_2$ content is about 5.8%, and that the $NO_x$ level has been reduced about 68% from an incoming level about 175 ppm., i.e., to about 56 ppm.

Repeating the testing with the probe raised so that the atomized aqueous urea solution is injected about 6 inches below the roof, effects an $NO_x$ reduction of about 62% at a mole ratio of about 1.43 to 1 (at a base $NO_x$ level of about 170 ppm and an $O_2$ content of about 5.4%) with still no significant slippage. By raising the rate at which aqueous urea is injected to about 4 moles $NH_3$ to 1 mole $NO_x$, a reduction of about 86% is achieved with an $NH_3$ slippage of about 10 ppm, for a base load of abut 175 ppm $NO_x$. If the operation of the combustor is changed to reduce the base load $NO_x$ to about 135 ppm, injection at the same molar ratio reduces the $NO_x$ about 82% with a slippage of about 8 ppm. Slippage should be maintained at a level not greater than about 44 ppm and is preferably about 10 ppm or less.

Although the invention has been described with regard to certain preferred embodiments which constitute the best mode known to the inventors for carrying out their invention at this time, it should be understood that various changes and modifications such as would be obvious to one skilled in this art can be made without deviating from the scope of the invention. For example, instead of using a single cyclone, a plurality of cyclones in parallel can be used. Instead of using a cyclone, a device may be employed which creates a strong vortex, as by tangentially introducing the gas stream into a confined enclosure of generally circular or elliptical cross section. The injectors preferably inject preheated liquid solution to reduce viscosity and to avoid solids from precipitating. By incorporation steam, the injectors form either fine droplets or coarse droplets not greater than about 500 microns in size. Particular features of the invention are emphasized in the claims which follow.

What is claimed is:

1. In a method for purifying gaseous combustion products by reducing the $NO_x$ content thereof by contacting a stream of hot gaseous combustion products with a reducing agent that effects a chemical reaction which reduces the $NO_x$ content by at least partial conversion to $N_2$, said reducing agent being ammonia, a precursor of ammonia or a mixture thereof in vapor or vaporizable form, the improvement comprising routing said stream, while at a temperature of at least about 1400° F., through a confined region of substantially circular cross section wherein a strong vortex is created as a result of substantially tangential entry of said stream and introducing said reducing agent into said stream immediately following entry into said confined region.

2. A method in accordance with claim 1 wherein said reducing agent is introduced into said stream in an amount sufficient to reduce the $NO_x$ content of said stream to no more than 200 ppm.

3. A method in accordance with claim 1 wherein said reducing agent is introduced into said stream to create an ammonia curtain at the core of said vortex, through which core said stream exits from said confined region.

4. In a method for purifying gaseous combustion products by reducing the $NO_x$ content thereof by contacting a stream of hot gaseous combustion products with a reducing agent that effects a chemical reaction which reduces the $NO_x$ content by at least partial conversion to $N_2$, said reducing agent being ammonia, a precursor of ammonia or a mixture thereof in vapor or vaporizable form, the improvement comprising routing said stream, while at a temperature of at least about 1400 F., through high-temperature cyclone separation means and injecting said reducing agent into a radially zero velocity zone within said cyclone separation means which is spaced radially inward from the outer boundary thereof, whereby said reducing agent is rapidly dispersed throughout said stream as it thereafter spirals within said cyclone separation means.

5. A method in accordance with claim 4 wherein said injection into said stream is effected sequentially at multiple points, each of which points lies about on a circle that is radially outward from the exit duct, or its vertical projection, which forms the inner boundary of an upper annular region of the cyclone separation means, said circle being at a distance equal to between about 0.1 L and 0.8 L therefrom, where L is the radial width of said annular region.

6. A method in accordance with claim 4 wherein said circle is at a location of about 0.5 L.

7. A method in accordance with claim 4 wherein said reducing agent is introduced in an amount between about 0.2 and about 10 moles of reducing agent per mole of $NO_x$.

8. A method in accordance with claim 4 wherein an aqueous solution of a $NO_x$ reducing agent is atomized by steam.

9. A method in accordance with claim 4 wherein said $NO_x$ reducing agent is introduced into said stream which is at a temperature between about 1400° F. and about 1900° F.

10. A method in accordance with claim 9 wherein said reducing agent is introduced into said stream wherein the $O_2$ content of said stream constitutes no more than 10% of total volume thereof.

11. A method in accordance with claim 10 wherein an aqueous solution of urea is introduced and atomized using steam.

12. A system for purifying gaseous combustion products by reducing the $NO_x$ content thereof by contact with a reducing agent, which system comprises conduit means for carrying a stream of gaseous combustion products at a high temperature, high-temperature cyclone separation means having a tangential inlet in an upper portion thereof connected to an outlet from said conduit means for generating a vortex flow of said stream therewithin, said cyclone separation means including a body cylinder section and an interior exit duct of generally circular cross section, and injection means for introducing a reducing agent into said stream in a zone of essentially zero velocity spaced radially inward from the outer boundary of said cyclone separator, said injection means being positioned at a location between about 0.1 L and about 0.8 L, where L is the radial distance between said exit duct and said body cylinder wall, whereby the agent is rapidly dispersed throughout the stream as it thereafter spirals downward.

13. A system in accordance with claim 11 wherein said injection is effected at multiple points through an upper boundary surface of said cyclone separation means.

14. A system in accordance with claim 11 wherein said injection means protrudes inward through a vertical, cylindrical sidewall of said cyclone separation means at a location with the upper 10% to about the upper 80% of the internal height of said cyclone vertical cylindrical section.

15. A system in accordance with claim 12 wherein said injection means is designed to inject liquid in the form of droplets not larger than about 500 microns in size.

16. A system in accordance with claim 12 wherein said injection means is designed to introduce said $No_x$ reducing agent in the form of an aqueous solution of urea into said cyclone separation means.

17. A system in accordance with claim 12 wherein said injection means introduces said $NO_x$-reducing agent into said cyclone separation means, at a vertical location equal to between about 0.1 h and about 0.9 h where h is the vertical dimension of said body cylinder section.

* * * * *

UNITED STATES PATENT AND TRADEMARK OFFICE
CERTIFICATE OF CORRECTION

PATENT NO.   :   4,756,890
DATED        :   July 12, 1988
INVENTOR(S)  :   John T. Tang et al.

It is certified that error appears in the above-identified patent and that said Letters Patent is hereby corrected as shown below:

Face of Patent, Abstract, line 7, change "of" to --or--.

Claim 1, lines 2 and 6, correct the spelling of --reducing--.

Claims 13 and 14, line 1, change "11" to --12--.

Signed and Sealed this

Thirteenth Day of December, 1988

*Attest:*

DONALD J. QUIGG

*Attesting Officer*       *Commissioner of Patents and Trademarks*